United States Patent
Towfiq

(10) Patent No.: US 9,829,409 B2
(45) Date of Patent: Nov. 28, 2017

(54) INTERFEROMETRIC MEASUREMENT METHOD FOR GUIDE HOLES AND FIBER HOLES PARALLELISM AND POSITION IN MULTI-FIBER FERRULES

(71) Applicant: Farhad Towfiq, Oceanside, CA (US)

(72) Inventor: Farhad Towfiq, Oceanside, CA (US)

(73) Assignee: SUMIX CORPORATION, Oceanside, CA (US)

( * ) Notice: Subject to any disclaimer, the term of this patent is extended or adjusted under 35 U.S.C. 154(b) by 0 days.

(21) Appl. No.: 14/697,784

(22) Filed: Apr. 28, 2015

(65) Prior Publication Data

US 2016/0320264 A1    Nov. 3, 2016

(51) Int. Cl.
*G01M 11/00*    (2006.01)
*G01B 11/27*    (2006.01)
*G01B 9/02*    (2006.01)

(52) U.S. Cl.
CPC ............... *G01M 11/30* (2013.01); *G01B 9/02* (2013.01); *G01B 11/272* (2013.01)

(58) Field of Classification Search
CPC .... G01M 11/30; G01M 11/331; G01M 11/31; G01M 11/33; G01N 21/17; G01N 21/954; G01N 2201/08; G01N 21/45; G01N 2021/7779; G01B 9/02023; G01B 11/03; G01B 11/14; G01S 17/66; G01S 17/42; G01S 7/4818; G01S 7/4808; G01S 7/4817; G01C 15/002
See application file for complete search history.

(56) References Cited

U.S. PATENT DOCUMENTS

| | | | | |
|---|---|---|---|---|
| 4,787,698 A * | 11/1988 | Lyons | ................... | B24B 19/226 385/60 |
| 5,459,564 A * | 10/1995 | Chivers | ..................... | G01B 9/04 356/477 |
| 5,611,010 A * | 3/1997 | Shiino | .................. | G02B 6/3879 29/750 |
| 5,636,020 A * | 6/1997 | Csipkes | ................. | G01B 11/24 356/477 |
| 6,074,100 A * | 6/2000 | Rowland | .................. | G02B 6/25 385/60 |
| 6,215,555 B1 * | 4/2001 | Chivers | ................ | G02B 6/3833 356/511 |

(Continued)

FOREIGN PATENT DOCUMENTS

| | | | | |
|---|---|---|---|---|
| JP | 2015075486 A * | 4/2015 | ......... | G01B 9/02049 |
| WO | WO 2016162550 A1 * | 10/2016 | ............... | G02B 6/38 |

OTHER PUBLICATIONS http://www.thefreedictionary.com/hole.*

*Primary Examiner* — Tarifur Chowdhury
*Assistant Examiner* — Mohamed K Amara
(74) *Attorney, Agent, or Firm* — Loza & Loza, LLP; Heidi L. Eisenhut

(57) ABSTRACT

An interferometric measurement method precisely determines parallelism and 3D position of guide pin holes and fiber holes in multi-fiber ferrules used in connectors. The parallelism and position are measured for the ferrule with inserted reference guide pins and reference fibers by scanning the ferrule from side in an interferometric system. Fiber hole deviations from designated locations on the ferrule end face and distance between the fiber holes and the guide pin holes are calculated as well.

10 Claims, 4 Drawing Sheets

(56) References Cited

U.S. PATENT DOCUMENTS

| | | | | |
|---|---|---|---|---|
| 6,718,099 B2 * | 4/2004 | Chivers | G02B 6/3833 | 385/52 |
| 8,203,702 B1 * | 6/2012 | Kane | G01J 3/02 | 356/139.05 |
| 8,573,856 B2 * | 11/2013 | Webb | G01B 11/02 | 385/53 |
| 2001/0008571 A1 * | 7/2001 | Chivers | G02B 6/3833 | 385/75 |
| 2001/0042410 A1 * | 11/2001 | Ogawa | B82Y 15/00 | 73/656 |
| 2003/0161584 A1 * | 8/2003 | Ohtsuka | G02B 6/3882 | 385/60 |
| 2003/0227633 A1 * | 12/2003 | Kobayashi | G01B 11/272 | 356/508 |
| 2004/0001205 A1 * | 1/2004 | Ge | G01B 11/26 | 356/510 |
| 2004/0013394 A1 * | 1/2004 | Norland | G02B 6/3807 | 385/137 |
| 2004/0101255 A1 * | 5/2004 | Dean, Jr. | G01B 9/02 | 385/85 |
| 2004/0227957 A1 * | 11/2004 | Liang | G01B 11/26 | 356/601 |
| 2004/0237331 A1 * | 12/2004 | Sarfaty | B24B 19/226 | 34/218 |
| 2005/0036742 A1 * | 2/2005 | Dean, Jr. | G02B 6/3885 | 385/71 |
| 2007/0098328 A1 * | 5/2007 | Dean, Jr. | G02B 6/3839 | 385/71 |
| 2009/0052843 A1 * | 2/2009 | Cherel | G02B 6/3851 | 385/59 |
| 2010/0208232 A1 * | 8/2010 | Hara | G01B 11/002 | 356/4.09 |
| 2011/0112410 A1 * | 5/2011 | Hirota | A61B 5/0066 | 600/478 |
| 2013/0022317 A1 * | 1/2013 | Norris | G02B 6/3865 | 385/78 |
| 2013/0163930 A1 * | 6/2013 | Jian | G02B 6/36 | 385/60 |
| 2015/0177097 A1 * | 6/2015 | Clarke | G01B 11/14 | 356/73.1 |
| 2016/0102999 A1 * | 4/2016 | Liesener | G01D 5/38 | 356/488 |
| 2016/0259130 A1 * | 9/2016 | Towfiq | G02B 6/385 | |
| 2016/0341545 A1 * | 11/2016 | Yamazaki | G01B 9/02076 | |
| 2017/0031106 A1 * | 2/2017 | Takano | G02B 6/3871 | |

* cited by examiner

INTERFEROMETRIC MEASUREMENT METHOD FOR GUIDE HOLES AND FIBER HOLES PARALLELISM AND POSITION IN MULTI-FIBER FERRULES

CROSS-REFERENCE TO RELATED APPLICATIONS

Not applicable.

BACKGROUND

Field of the Invention

The present invention relates to the field of measuring the geometry of fiber optic ferrules used in multi-fiber connectors by means of interferometric microscopes. More specifically, the invention relates to guide holes parallelism and fiber angle interferometric measurement, as well as the location of the fiber holes on the ferrule end face.

Description of the Related Art

Manufacturers of fiber optic connectors seek ways to produce the connectors with low transmission loss and low back reflection. End faces of fiber optic connectors must satisfy certain criteria for effective fiber mating as required by the industry standards. They must be clean and their surface geometry must provide for good physical contact and low signal loss.

Various methods are applied for inspecting connector end faces by means of interferometric microscopes (see U.S. Pat. No. 5,459,564 A and U.S. Pat. No. 6,705,767 B1). In the above cited inventions, connectors are so aligned in the interferometric system that their end faces are perpendicular to the optical axis of the interferometric microscope. Such analysis methods aim at inspecting connector end faces from which interferometry data is obtained.

In addition to the end face inspection of fiber optic connectors for the purpose of measuring parameters of the end face surface, there is a need in measuring other connector and ferrule parameters. For example, it is necessary to measure parallelism and position of guide pin holes and fiber holes of multi-fiber ferrules.

In multi-fiber connector plugs two guide pins enable precise alignment between mating male and female connectors to minimize the optical insertion loss. When the two guide pins of a male connector are inserted into the guide holes of a female connector, the connectors are mated properly and good physical contact is achieved.

For the precise fiber alignment of multi-fiber connectors, it is also important that the axes of the fibers are not tilted relative to each other and relative to the axes of the guide pin holes. Ideally, the axes of the fiber holes must be parallel to each other and to the axes of the guide pin holes.

In addition to parallel alignment of the guide pin holes and the fiber holes, it is also important that the multiple optical fiber holes are not deviated from their designated locations on the end face along the axis that passed through the guide hole centers as set in the industry standards.

Manufacturers of fiber optic connectors need to measure the parallelism and position of the guide holes and fiber holes to insure the quality of their connectors and the compliance with the industry standards. It has not been possible to measure these parameters by end face scanning.

There are known methods for measuring XY fiber hole deviations from designated locations. The method suggested by International Electrotechnical Commission standard IEC 61300-3-27 describes the measurement procedure by means of a 2D microscope accompanied with other equipment. The method declared in U.S. Pat. No. 8,699,012 B2 describes how to measure fiber alignment by detecting XY positions of light beams that pass through guide pin holes and fiber holes. Both methods allow to determine XY positions of fiber holes and guide holes.

The present invention suggests inserting reference fibers into the fiber holes and reference guide pins into the guide pin holes and then scanning these inserted fibers and guide pins from side by an interferometric microscope. The reference fibers and guide pins also represent 3D positions and angles of the fiber holes and the guide holes. Subsequently, it is possible to determine locations of guide pin holes and fiber hole on ferrule end face.

SUMMARY OF THE INVENTION

The main concept of the present method is obtaining the interferometric data from reference fibers and reference guide pins inserted into a multi-fiber ferrule by scanning it from side. It aims at guide holes parallelism and fiber angle interferometric measurement and determining deviations of fiber holes from their designated locations on the ferrule end face.

The parallelism of fiber holes and guide holes in ferrules that are used in multi-fiber connectors is measured by an interferometric microscope accompanied with special fixtures for side scanning A special fixture is used that positions the ferrule so that its end face is parallel to the optical axis of the interferometric microscope and the axes of its guide holes and fiber holes are orthogonal to it. This enables interferometric measurement of ferrule side perpendicular to the end face.

Alternatively, the ferrule can be positioned in a traditional way with the end face perpendicular to the optical axis of the interferometric microscope. A special mirror that turns the optical axis of the microscope by 90 degrees can be included into the connector adapter or fixture in such case. The mirror can have a rectangular ledge when there is a need to compensate insufficient voltage range of interferometer piezo element.

The ferrule is measured with inserted reference guide pins and inserted reference fiber ribbon with bare ends. It is possible to apply any conventional guide pins that are used in manufacturing of male MTRJ or MTP/MPO fiber optic connectors.

The fiber ribbon which is inserted into the ferrule being measured has to have bare fiber ends with length that insures the required accuracy of measurements. The length can vary from few microns to any larger length as permitted by the interferometric microscope field of view. There is special equipment in manufacturing of multi-fiber optic connectors (strippers) that can be also applied in this method for producing the bare fiber ends.

Alternatively to the fiber ribbon, another reference object can be used similar to the fiber ribbon by its geometrical dimensions and made of hard materials.

Interferometric fringe pattern is formed on the reference guide pins and on the bare fibers of the reference ribbon. The required angles X and Y are calculated from the data obtained during the interferometric scanning.

Angle X and angle Y between each guide pin axis and system Z axis, as well as angle X and angle Y between each fiber axis and the system Z axis are calculated.

The distance between the fiber holes and deviations of fiber hole locations along axis X and Y are calculated as well. Another parameter being calculated is the distance between the guide pin holes.

The provided method can be applied not only to multi-fiber MTP/MPO connectors and MT ferrules with 12 fibers, but also to multi-fiber connectors and ferrules with 2, 4, 8, 16, 24, 48, 72 and other numbers of fibers, of both PC and APC types.

BRIEF DESCRIPTION OF THE DRAWINGS

The presented method can be better understood with reference to the following drawings. Like reference numerals designate corresponding parts throughout several drawings.

FIG. 8 is a top view of the object being measured with the illustrated fiber angles.

FIG. 9 is a side view of the object being measured with the illustrated fiber angles.

REFERENCE NUMERALS IN THE DRAWINGS

| | |
|---|---|
| 1 interferometric microscope | 2 opening on the microscope front panel |
| 3 special fixture for side measurements of multi-fiber connectors | 4 multi-fiber ferrule ready for measurement |
| 5, 5' reference guide pins | 6, 6' guide pin holes |
| 7, 7' axes of the reference guide pins | 8 system Z axis |
| 9, 9' X angles between the system Z axis and the reference guide pins' axes | 10, 10' Y angles between the system Z axis and the guide pins' axes |
| 11 reference fiber ribbon | 12 X angle between the system Z axis and the first fiber in the ribbon |
| 13 X angle between the system Z axis and the second fiber in the ribbon | 14 X angle between the system Z axis and the last fiber in the ribbon |
| 15 Y angle between the system Z axis and the first fiber in the ribbon | 16 Y angle between the system Z axis and the second fiber in the ribbon |
| 17 Y angle between the system Z axis and the last fiber in the ribbon | 18 fiber holes (top view) |
| 20 fiber hole in its real location | 19 designated locations of fiber holes on the end face |
| | 21 fiber hole deviation along axis X |
| 22 fiber hole deviation along axis Y | 23 special fixture with a mirror element for measurements of multi-fiber connectors |
| 24 enlarged mirror element | | ments. The ferrule contains first and second reference guide pins and a reference fiber ribbon inserted into the ferrule as explained by FIG. 2.

Figure 2:
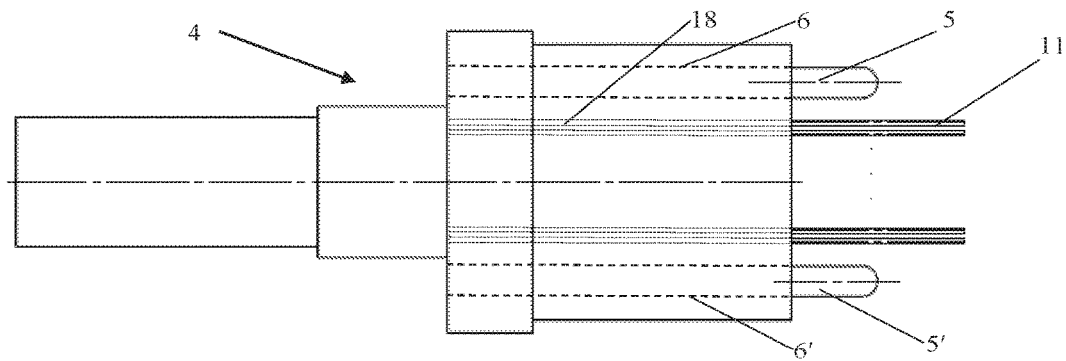
FIG. 2 is a top view of a measurement object ready for testing.

FIG. 2 shows a top view of a multi-fiber ferrule 4 in a state ready for testing. In original state, the multi-fiber ferrule has first and second guide holes 6 and 6' in which first and second alignment guide pins 5 and 5' are inserted. The multi-fiber ferrule 4 also has a number of fiber holes 18, depending on the type of a multi-fiber connector being manufactured. The number of the fiber holes could vary from 2 for MTRJ multi-fiber connectors, to 4, 6, 8, 12, 16, 24, 48, 72 and other for other connector types. FIG. 2 schematically shows only first two and last two fiber holes.

The fiber holes can be arranged in rows. The number of fiber rows in multi-fiber connectors could exceed one. The measurement method represented in the present invention allows measuring the parallelism of the fiber holes for one fiber row or for multiple fiber rows. For simplicity purposes, the multi-fiber ferrule is illustrated with one row on the accompanying drawings.

The measurement method represented in the present invention is aimed at interferometric measurement of guide holes 6 and 6' parallelism and fiber angles of a multi-fiber ferrule.

In the original state of the ferrule, the two guide holes 6 and 6' are empty. To make the interferometric measurements of the guide holes possible, two reference guide pins 5 and 5' are inserted into the guide holes as shown on FIG. 2. Any guide pins that are used in manufacturing of male MTRJ or MTP/MPO fiber optic connectors can be used for this purpose. The reference guide pins are inserted into the ferrule for measurement purposes in the same way they are inserted for the purpose of manufacturing male multi-fiber connectors.

DETAILED DESCRIPTION OF THE INVENTION

Reference will now be made in detail to the presented measurement method illustrated in the accompanying drawings.

Figure 1:
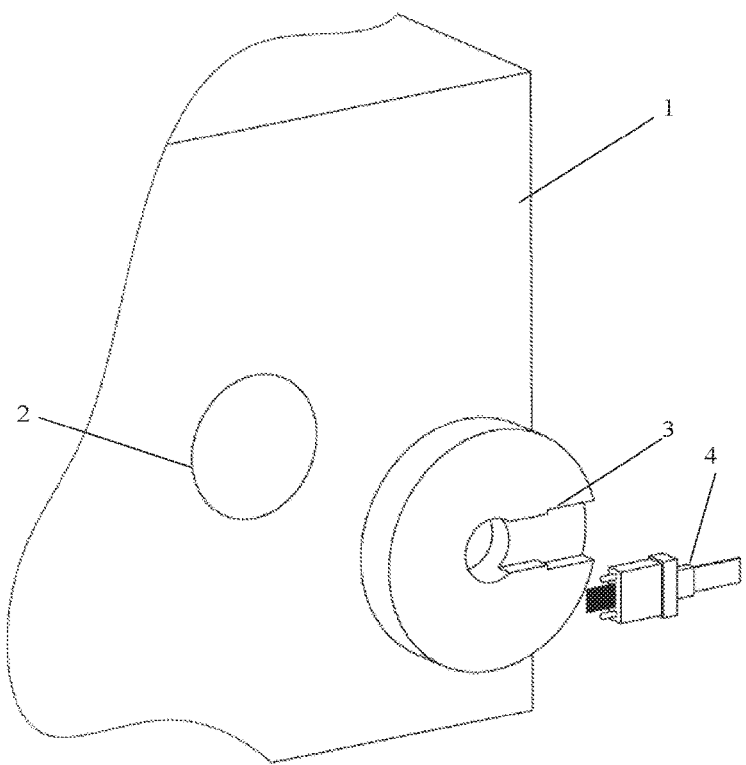
FIG. 1 is a schematic view of the measurement system in its exemplary embodiment.

FIG. 1 illustrates an exemplary embodiment of the present invention. The reference number 1 represents an interferometric microscope. A special fixture 3 for side measurements of multi-fiber ferrules is mounted on the microscope which has an opening 2 to receive the fixture. A multi-fiber ferrule 4 is inserted into the fixture for side face measure- Alternatively, it is possible to use other objects similar to the guide pins by their geometrical dimensions and made of hard materials.

In the original state of the ferrule being measured, the fiber holes 18 are empty. For the purpose of the interferometric measurements, a reference fiber ribbon 11 is inserted into the fiber holes. The reference fiber ribbon 11 should be prepared for measurements. Fiber ends in the ribbon should be stripped from the outer coating so that bare fiber ends rise above the end face surface for the purpose of interferometric measurements as shown on FIG. 2. The lengths for which the bare fiber ends should rise above the surface are limited by the interferometric microscope field of view, from few microns to any larger length. The larger the length the better the measurement precision.

Figure 3:
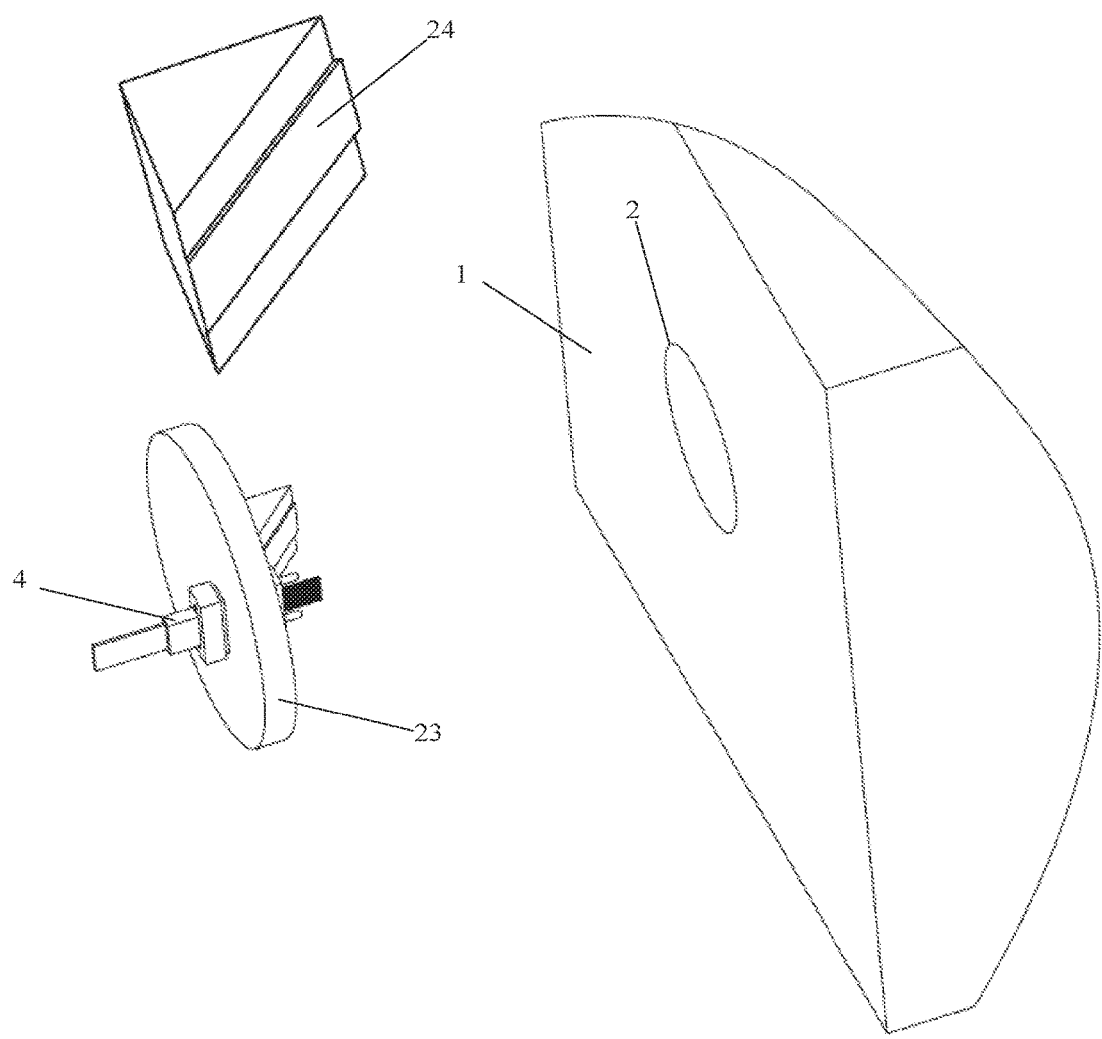
FIG. 3 is a schematic view of the measurement system which includes a connector fixture equipped with a mirror.

FIG. 3 shows the interferometric system in which a multi-fiber ferrule is positioned along the optical axis of the microscope. It consists of interferometric microscope 1 with opening 2 for mounting a fixture 23 with inserted ferrule 4. The fixture 23 is equipped with a prism element 24 that has a mirror coating on its base rectangular side. The mirror turns the interference image from the connector side face by 90 degrees and directs it into the microscope objective. The mirror side of the prism element can have a rectangular ledge when there is a need to decrease scanning range and measurement time.

Figure 4:
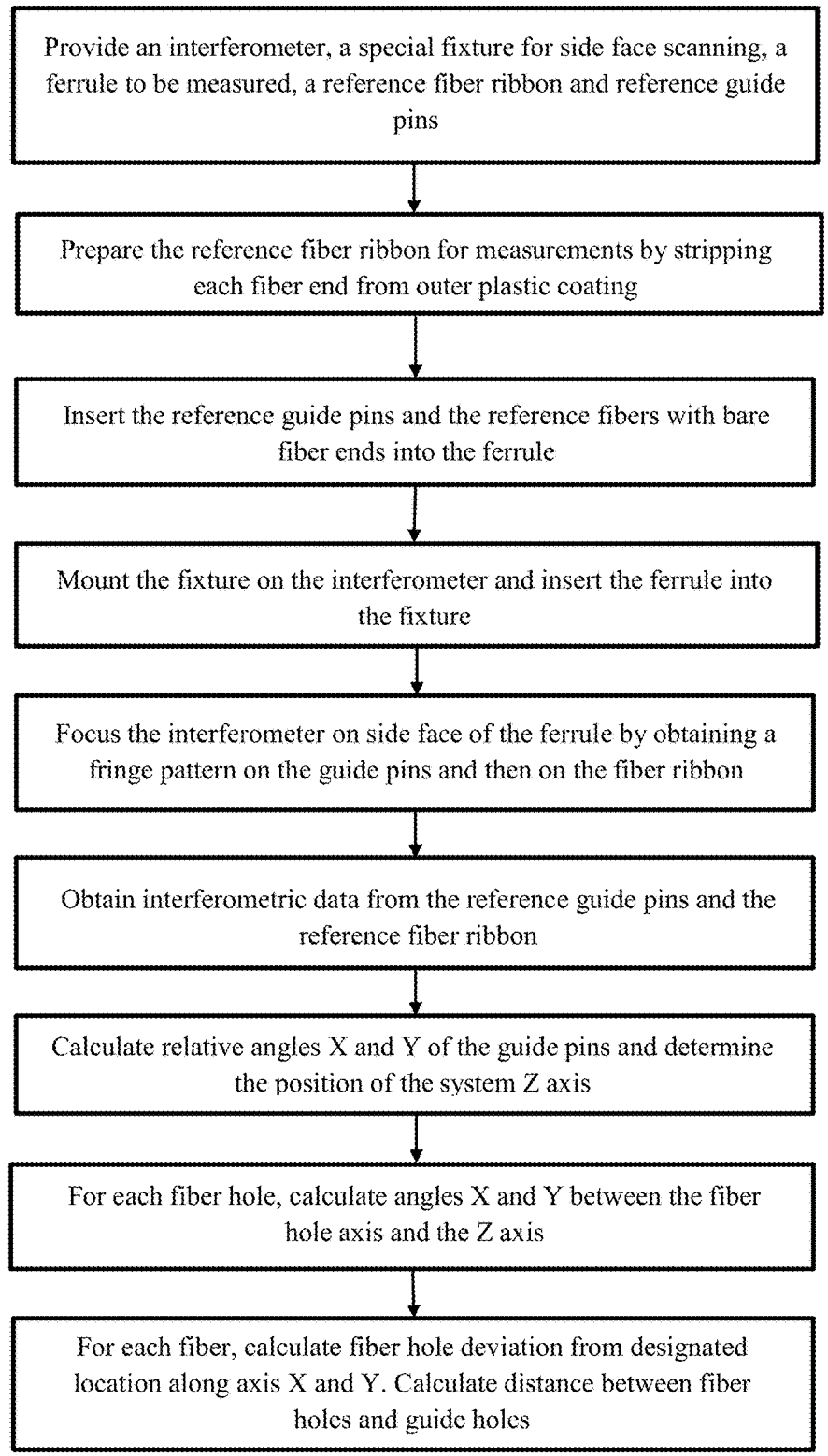
FIG. 4 is a flowchart of the measurement method in accordance with the present invention.

FIG. 4 illustrates a method of measuring the parallelism of guide holes and fiber holes, as well as fiber hole locations, in multi-fiber ferrules used in connectors according to the present invention. The parallelism is measured by an interferometric microscope. Special fixture for side face scanning is provided together with the microscope for positioning of the ferrule in the measurement system. The special fixture is mounted on the interferometric microscope and the ferrule is inserted into the fixture.

According to the proposed method, the ferrule is measured with inserted reference fiber ribbon with bare fiber ends and the reference guide pins. The fiber ribbon is prepared for measurements as described in the explanation for FIG. 2 and has bare fiber ends.

After the ferrule is inserted into the special fixture and is ready for measurements, the interferometric microscope is focused and a fringe pattern is successively obtained on the reference guide pins and the reference fiber ribbon. Interferometric data is obtained from the reference guide pins and the reference fiber ribbon.

Then calculations of relative angles of the reference guide pins along axis X and along axis Y are performed. When the relative angles are known, the position of the system Z axis which is the averaged line of the two guide pin holes is determined.

The final two steps are calculations of angles X and Y between each fiber hole and the system Z axis. Deviations from designated location along axis X and Y for each fiber and distance between fiber holes and guide hole are calculated as well.

Figure 5:
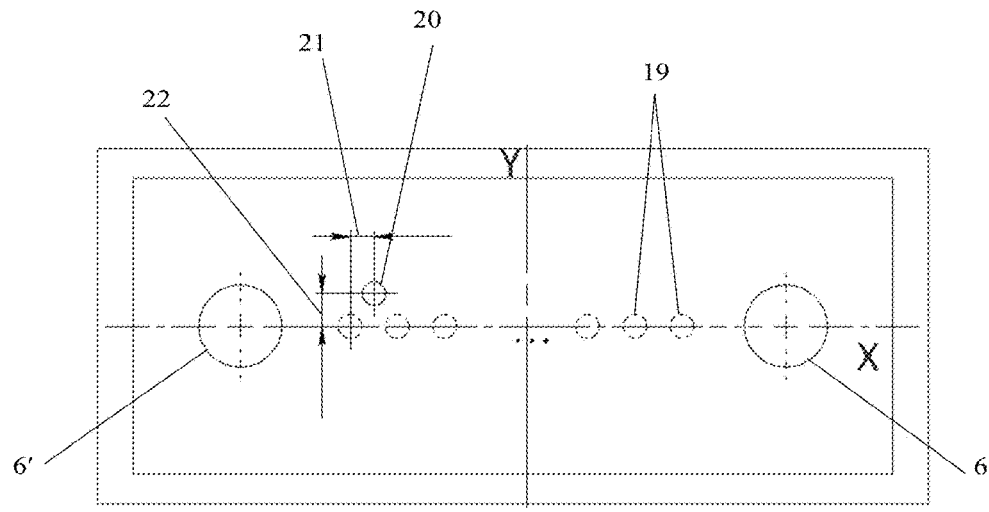
FIG. 5 is an end face view of the object being measured that illustrates the optical interface coordinate system and fiber hole deviations along axis X and Y.

FIG. 5 explains a system of coordinates X and Y. An X-axis passes through centers of first and second guide holes 6 and 6' on the ferrule end face. A perpendicular Y-axis passes through the midpoint of the line connecting the guide hole centers.

FIG. 5 also illustrates deviations of fiber holes from designated locations on the end face. Only one fiber in its deviated location is shown schematically.

The reference number 19 represents designated locations of the fiber holes according to the industry standards. The reference number 20 represents a fiber hole deviated from its designated location.

The fiber hole deviations along axes X and Y are shown by number 21 and 22 respectively.

Figure 6:
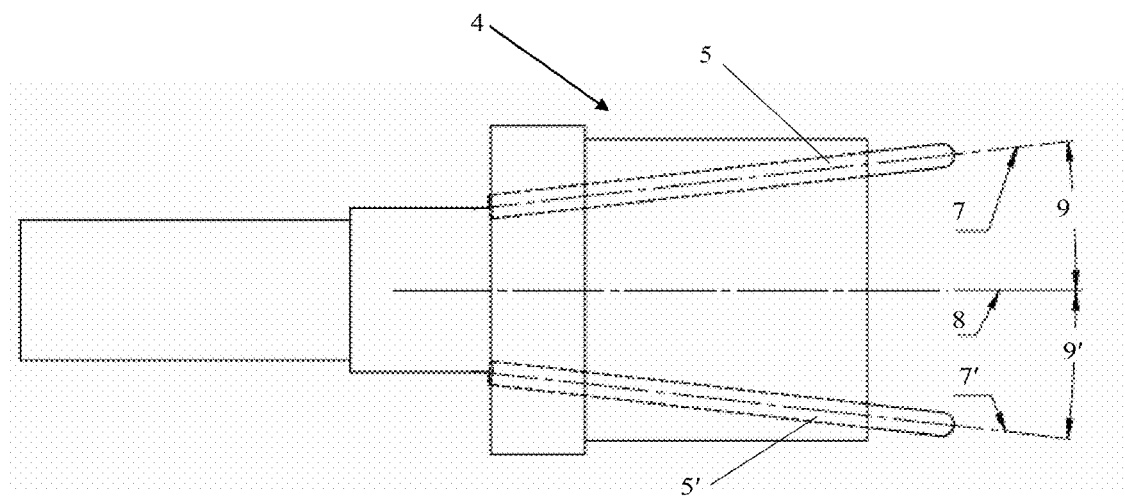
FIG. 6 is a top view of the object being measured with the illustrated guide pin angles.
Figure 7:
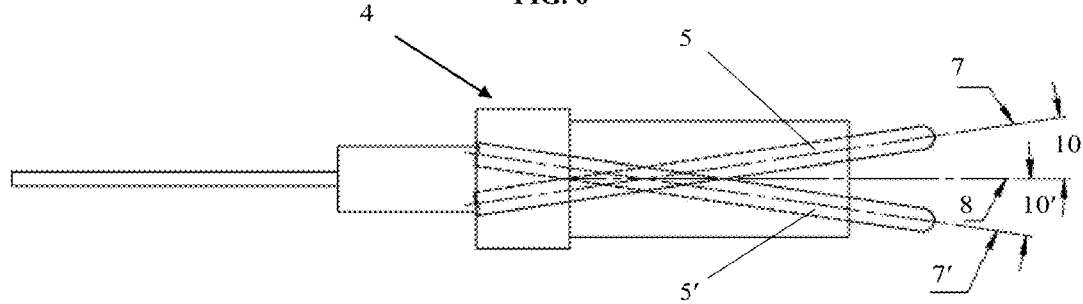
FIG. 7 is a side view of the object being measured with the illustrated guide pin angles.

The top and side views of the ferrule 4 represented on FIG. 6 and FIG. 7 respectively demonstrate relative angles of the axes 7 and 7' of the reference guide pins 5 and 5'. The reference numerals 9 and 9' designate the angles along axis X between the averaged line 8 (the system Z axis) and the guide pin axes 7 and 7' respectively.

The reference numerals 10 and 10' designate the angles along axis Y between the averaged line 8 (the system Z axis) and the guide pin axes 7 and 7' respectively.

The top and side views of the ferrule 4 represented on FIG. 8 and FIG. 9 respectively demonstrate the angles between the fiber axes in the reference fiber ribbon 11 and the system Z axis 8. For simplicity reasons, only first, second and last fibers are shown on FIG. 8 and FIG. 9. The reference numerals 12, 13 and 14 designate the angles along axis X between the averaged line 8 and the axes of the first, second and last fiber respectively.

The reference numerals 15, 16 and 17 designate the angles along axis Y between the system Z axis 8 and the axes of the first, second and last fibers respectively.

I claim:

1. A method for interferometric measurement of the geometry of a multi-fiber optic ferrule used in a connector, the method comprising:
positioning one or more fibers into a respective one or more fiber holes in the ferrule;
positioning guide pins into at least respective first and second guide pin holes in the ferrule; and
scanning a side face of the ferrule with an interferometric microscope to obtain interferometric data of at least the one or more fibers and guide pins, wherein the side face of the ferrule is perpendicular to an end face of the ferrule and the one or more fibers pass through the end face, where the end face is positioned one of perpendicular or parallel to an optical axis of the interferometric microscope.

2. The method of claim 1, wherein the interferometric data is obtained by focusing the interferometric microscope on a side face of the guide pins and a side face of the one or more fibers and obtaining a fringe pattern on the guide pins and the one or more fibers.

3. The method of claim 1, further comprising:
determining angles of the guide pins relative to the optical axis based on the interferometric data to determine the parallelism of the guides pins relative to one another; and
determining angles between the one or more fibers and the system Z axis that is defined as an average line between the guide pin axes.

4. The method of claim 1, further comprising:
determining based on the interferometric data one or more of (a) deviations of the one or more fiber hole locations from a designated location for each respective fiber hole; (b) a distance between the one or more fiber holes, and (c) a distance between the guide pin holes.

5. The method of claim 1, wherein the one or more fibers are conventional fibers with bare fiber ends.

6. The method of claim 1, wherein the one or more fibers further comprise reference objects similar in geometrical dimensions to the conventional fibers with bare fiber ends and are made of a hard material such that the objects will not deform by their own weights.

7. The method of claim 1, wherein the guide pins are conventional guide pins used in male multi-fiber connectors.

8. The method in claim 1, wherein the guide pins comprise objects having geometrical dimensions similar to conventional guide pins used in male multi-fiber connectors and are made of a hard material.

9. The method of claim 1, further comprising:
positioning the ferrule relative to the interferometric microscope with a fixture configured to position the ferrule end face position parallel to the optical axis of the interferometric microscope and position the ferrule for scanning of the side face of the ferrule.

10. The method of claim 1, further comprising:
positioning the ferrule relative to the interferometric microscope with a fixture that includes a mirror element configured to turn the optical axis of the interferometric microscope by 90 degrees and enable the ferrule end face to be positioned perpendicular to the optical axis of the interferometric microscope.

\* \* \* \* \*